(12) United States Patent
Kim et al.

(10) Patent No.: US 11,056,251 B2
(45) Date of Patent: Jul. 6, 2021

(54) PATTERNING FORMATION METHOD, MANUFACTURING METHOD OF ELECTRICAL DEVICES USING THE SAME AND VEHICULAR ELECTRICAL DEVICE

(71) Applicant: JIN YOUNG GLOBAL CO., LTD., Gyeongsangbuk-do (KR)

(72) Inventors: Dong Sik Kim, Gyeongsangbuk-do (KR); Kyong Do Kim, Gyeongsangbuk-do (KR)

(73) Assignee: JIN YOUNG GLOBAL CO., LTD., Gyeongsangbuk-Do (KR)

(*) Notice: Subject to any disclaimer, the term of this patent is extended or adjusted under 35 U.S.C. 154(b) by 0 days.

(21) Appl. No.: 16/665,698

(22) Filed: Oct. 28, 2019

(65) Prior Publication Data
US 2020/0143957 A1    May 7, 2020

(30) Foreign Application Priority Data
Nov. 2, 2018    (KR) .................... 10-2018-0133581

(51) Int. Cl.
*H01B 7/29*    (2006.01)
*C08J 5/18*    (2006.01)
(Continued)

(52) U.S. Cl.
CPC ............. *H01B 7/292* (2013.01); *C08J 5/18* (2013.01); *H01B 3/307* (2013.01); *H01B 7/08* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 3,057,952 A | * | 10/1962 | Gordon | H05K 3/4635 174/117 R |
| 3,492,538 A | * | 1/1970 | Fergusson | H01R 12/79 361/803 |

(Continued)

FOREIGN PATENT DOCUMENTS

| | | |
|---|---|---|
| EP | 1354385 B1 | 10/2003 |
| JP | H02-164532 A | 6/1990 |

(Continued)

OTHER PUBLICATIONS

Office Action issued for corresponding Korean Patent Application No. 10-2018-0133581 dated Dec. 16, 2019, along with a partial English machine translation.

(Continued)

*Primary Examiner* — William H Mayo, III
*Assistant Examiner* — Krystal Robinson
(74) *Attorney, Agent, or Firm* — Hauptman Ham, LLP

(57) ABSTRACT

Disclosed herein is a patterning formation method including printing on a film base, a manufacturing method of an electrical device using the same, and a vehicular electrical device. More particularly, disclosed herein is a patterning formation method including arranging a poly cyclohexylene dimethylene terephthalate (PCT) film as a base film or as an upper part film such as a coverlay film, and patterning a material such as a metal by a printing method or connecting printing electronic technologies on at least a part of the PCT film. Also disclosed herein is a manufacturing method of an electrical device using the same and a vehicular electrical device.

3 Claims, 20 Drawing Sheets

(51) Int. Cl.
*H01B 3/30* (2006.01)
*H01B 7/08* (2006.01)
*H01B 13/00* (2006.01)

(52) U.S. Cl.
CPC ...... *H01B 13/0013* (2013.01); *C08J 2367/02* (2013.01)

(56) References Cited

U.S. PATENT DOCUMENTS

| | | | | |
|---|---|---|---|---|
| 3,727,168 A * | 4/1973 | Henschen | ............... | H01R 31/02 439/498 |
| 3,766,439 A * | 10/1973 | Isaacson | ............... | H05K 1/189 361/714 |
| 4,372,634 A * | 2/1983 | Ritchie | ............... | H01R 12/88 439/329 |
| 4,375,379 A * | 3/1983 | Luetzow | ............... | H01B 7/0838 156/292 |
| 4,719,335 A * | 1/1988 | Batliwalla | ............... | H01C 7/027 219/528 |
| 4,781,601 A * | 11/1988 | Kuhl | ............... | H01R 12/79 361/749 |
| 4,812,135 A * | 3/1989 | Smith | ............... | H01B 7/0838 174/117 F |
| 4,870,308 A * | 9/1989 | Sismour, Jr. | ............... | H02K 3/51 310/71 |
| 5,008,656 A * | 4/1991 | Cheriff | ............... | H05K 1/112 345/206 |
| 5,153,302 A | 10/1992 | Masuda et al. | | |
| 5,219,640 A * | 6/1993 | Gazit | ............... | H05K 1/028 174/250 |
| 5,220,488 A * | 6/1993 | Denes | ............... | B29C 70/78 174/254 |
| 5,313,416 A * | 5/1994 | Kimura | ............... | H01L 23/5387 257/E23.177 |
| 5,345,205 A * | 9/1994 | Kornrumpf | ............... | H01L 24/18 333/246 |
| 5,406,027 A * | 4/1995 | Matsumoto | ............... | H01L 25/162 174/260 |
| 5,525,760 A * | 6/1996 | Rohatgi | ............... | H05K 1/0218 174/254 |
| 5,923,115 A * | 7/1999 | Mohr, III | ............... | H01L 41/0475 310/334 |
| 5,933,712 A * | 8/1999 | Bernhardt | ............... | H01L 23/5387 438/125 |
| 6,206,507 B1 * | 3/2001 | Hino | ............... | B41J 2/14 347/50 |
| 6,208,521 B1 * | 3/2001 | Nakatsuka | ............... | H01L 23/5387 174/254 |
| 6,333,467 B1 * | 12/2001 | Matsuo | ............... | H01R 12/592 174/250 |
| 6,344,616 B1 * | 2/2002 | Yokokawa | ............... | H01B 7/00 174/117 F |
| 6,589,817 B1 * | 7/2003 | Takahashi | ............... | H01L 23/13 438/117 |
| 6,699,730 B2 * | 3/2004 | Kim | ............... | H01L 23/5387 257/E23.177 |
| 6,879,032 B2 * | 4/2005 | Rosenau | ............... | G02B 6/4201 257/696 |
| 6,978,073 B2 * | 12/2005 | Yamamoto | ............... | G02B 6/3644 385/137 |
| 7,323,245 B2 * | 1/2008 | Tai | ............... | H05K 1/028 428/407 |
| 7,407,408 B1 * | 8/2008 | Taylor | ............... | H05K 1/118 439/449 |
| 7,514,773 B2 * | 4/2009 | Leddige | ............... | H01L 23/5387 257/685 |
| 8,148,641 B2 * | 4/2012 | Tanaka | ............... | H05K 3/323 174/250 |
| 8,574,008 B2 * | 11/2013 | Große | ............... | H01M 2/202 439/627 |
| 8,853,562 B2 * | 10/2014 | Izawa | ............... | H05K 9/0084 174/350 |
| 8,895,865 B2 * | 11/2014 | Lenahan | ............... | H05K 1/0215 174/254 |
| 9,524,811 B2 * | 12/2016 | Adachi | ............... | H01B 7/0045 |
| 9,633,971 B2 * | 4/2017 | Uzoh | ............... | H01L 24/83 |
| 10,643,976 B2 * | 5/2020 | Otsuka | ............... | H01L 25/0657 |
| 2002/0189847 A1 * | 12/2002 | Sakurai | ............... | C09J 9/02 174/117 FF |
| 2003/0080438 A1 * | 5/2003 | Matsuura | ............... | H05K 1/147 257/778 |
| 2004/0016565 A1 | 1/2004 | Gallant et al. | | |
| 2005/0040581 A1 * | 2/2005 | Ito | ............... | B41J 2/14209 270/58.13 |
| 2005/0211461 A1 * | 9/2005 | Horikoshi | ............... | H05K 3/244 174/117 FF |
| 2006/0035152 A1 * | 2/2006 | Nishimura | ............... | H01M 2/0207 429/234 |
| 2006/0093809 A1 * | 5/2006 | Hebrink | ............... | C09D 5/20 428/323 |
| 2006/0244177 A1 | 11/2006 | Kaneto et al. | | |
| 2007/0218781 A1 * | 9/2007 | Yokai | ............... | H05K 3/363 439/752 |
| 2009/0166838 A1 * | 7/2009 | Gokan | ............... | H01L 25/0657 257/686 |
| 2010/0315789 A1 * | 12/2010 | Sato | ............... | H01R 13/2414 361/729 |
| 2012/0080089 A1 * | 4/2012 | Aoyama | ............... | C08J 5/18 136/256 |
| 2012/0267156 A1 * | 10/2012 | Lin | ............... | H05K 1/028 174/262 |
| 2013/0320583 A1 * | 12/2013 | Mitchell | ............... | H01M 8/0243 264/105 |
| 2014/0000943 A1 * | 1/2014 | Kang | ............... | H05K 3/10 174/254 |
| 2014/0124257 A1 * | 5/2014 | Yoshihara | ............... | H05K 1/023 174/350 |
| 2014/0227637 A1 | 8/2014 | Kato et al. | | |
| 2014/0299360 A1 * | 10/2014 | Yoshida | ............... | H05K 3/027 174/251 |
| 2015/0147500 A1 * | 5/2015 | Toy | ............... | C08L 67/02 428/35.1 |
| 2015/0216057 A1 | 7/2015 | Park et al. | | |
| 2015/0343750 A1 * | 12/2015 | Liu | ............... | B32B 7/12 156/185 |
| 2016/0014893 A1 * | 1/2016 | Yosui | ............... | H05K 1/028 174/254 |
| 2016/0211598 A1 * | 7/2016 | Costello | ............... | H01R 12/73 |
| 2016/0372811 A1 * | 12/2016 | Yosui | ............... | H01P 3/08 |
| 2017/0223827 A1 * | 8/2017 | Yamada | ............... | H05K 3/1208 |
| 2017/0327060 A1 * | 11/2017 | Nakajima | ............... | H01B 13/01254 |
| 2019/0088912 A1 | 3/2019 | Goh et al. | | |
| 2019/0165502 A1 | 5/2019 | Hiroki et al. | | |

FOREIGN PATENT DOCUMENTS

| | | |
|---|---|---|
| JP | H2-164532 A | 6/1990 |
| JP | H6-59686 B2 | 8/1994 |
| JP | H8-22718 A | 1/1996 |
| JP | 2002-117726 A | 4/2002 |
| JP | 2003-45508 A | 2/2003 |
| JP | 2008-226512 A | 9/2006 |
| JP | 2008-235887 A | 10/2006 |
| JP | 2006-296678 A | 11/2006 |
| JP | 2011-124178 A | 6/2011 |
| JP | 2011-187167 A | 9/2011 |
| JP | 2012-256488 A | 12/2012 |
| JP | 2015-012046 A | 1/2015 |
| JP | 2015-204410 A | 11/2015 |
| JP | 2016-502227 A | 1/2016 |
| JP | 2017-37771 A | 2/2017 |
| JP | 2017-152271 A | 8/2017 |
| JP | 2019-57499 A | 4/2019 |
| KR | 10-2008-0061780 A | 7/2008 |
| KR | 10-2011-0097529 A | 8/2011 |
| KR | 10-2012-0130642 A | 12/2012 |
| KR | 10-2012-0131013 A | 12/2012 |
| KR | 10-2014-0096039 A | 8/2014 |
| KR | 10-1501449 B1 | 3/2015 |

(56) References Cited

FOREIGN PATENT DOCUMENTS

| KR | 10-2015-0145211 A | 12/2015 |
| KR | 10-2016-0000621 A | 1/2016 |
| KR | 10-2017-0074530 A | 6/2017 |
| WO | 2011/076816 A1 | 6/2011 |
| WO | 2017/204084 A1 | 11/2017 |

OTHER PUBLICATIONS

Office Action issued for corresponding Korean Patent Application No. 10-2018-0133581 dated Jun. 10, 2020, along with a partial English machine translation.

Office Action issued for corresponding Korean Patent Application No. 10-2019-0068573 dated Jan. 14, 2020, along with a partial English machine translation.

Office Action issued for corresponding Korean Patent Application No. 10-2019-0068573 dated Jul. 9, 2020, along with a partial English machine translation.

Office Action issued for corresponding Korean Patent Application No. 10-2019-0068581 dated Jan. 14, 2020, along with a partial English machine translation.

Office Action issued for corresponding Korean Patent Application No. 10-2019-0068582 dated Jan. 14, 2020, along with a partial English machine translation.

Office Action issued for corresponding Korean Patent Application No. 10-2019-0068583 dated Jan. 14, 2020, along with a partial English machine translation.

Office Action issued for corresponding Korean Patent Application No. 10-2019-0068584 dated Jan. 14, 2020, along with a partial English machine translation.

Office Action issued for corresponding Korean Patent Application No. 10-2019-0068585 dated Jan. 14, 2020, along ith a partial English machine translation.

The extended European Search Report dated Mar. 18, 2020 in connection with the counterpart European Patent Application No. 19206545.6, citing the above reference(s).

Office Action issued for corresponding Japanese Patent Application No. 2019-211109 dated Dec. 17, 2019, along with an English translation, citing above references.

Decision to Grant issued for corresponding Japanese Patent Application No. 2019-185217 dated Dec. 17, 2019, along with an English translation, citing above references.

Korean Office Action dated Mar. 12, 2019 for corresponding Korean Application No. 10-2018-0133581, citing the above references, with partial English machine translation.

Korean Office Action dated Jul. 8, 2019 for corresponding Korean Application No. 10-2018-0133581, citing the above references, with partial English machine translation.

Japanese Office Action dated Aug. 27, 2019 for corresponding Japanese Application No. 2019-144343, citing the above references, with partial English machine translation.

Japanese Office Action dated Nov. 5, 2019 for corresponding Japanese Application No. 2019-185217, citing the above references, with partial English machine translation.

\* cited by examiner

//PATTERNING FORMATION METHOD, MANUFACTURING METHOD OF ELECTRICAL DEVICES USING THE SAME AND VEHICULAR ELECTRICAL DEVICE

PRIORITY CLAIM AND CROSS-REFERENCE

The instant application claims priority from Korean Patent Application No. KR10-2018-0133581 filed on Nov. 2, 2018 in the Korean Intellectual Property Office (KIPO). The entirety of the priority document is hereby incorporated herein by reference.

BACKGROUND

Electrical devices such as wired harnesses, flexible flat cables (FFC), flexible printed circuits (FPC), coaxial cables and the like are used as interfaces for electrically connecting various electronic devices, such as an electronic circuit board and the like.

Wired harnesses are formed by enclosing a conductive wire with an insulation coating. The conductive wire is connected to a connector terminal by pressure bonding or a crimping method, and is connected to an electronic circuit board (PCB) by a soldering method, an instrument assembly method in which a connection of a male connector assembly and a female connector assembly are formed by the pressure bonding, or a crimping method.

The flexible flat cables (FFC) are formed by a method in which an adhesive is formed on an insulating film, and a conductive wire is formed on the adhesive so as to extend in a longitudinal direction and surround the adhesive.

The flexible printed circuits (FPC) are formed by a method in which a poly imide (PI) film or a poly ethylene napthalene (PEN) film is used as a base film. A copper conductor is formed into a thin film on the base film. After etching the copper conductor to form a circuit structure, another PI film or PEN film is bonded to an upper side of the base film as the upper part film.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
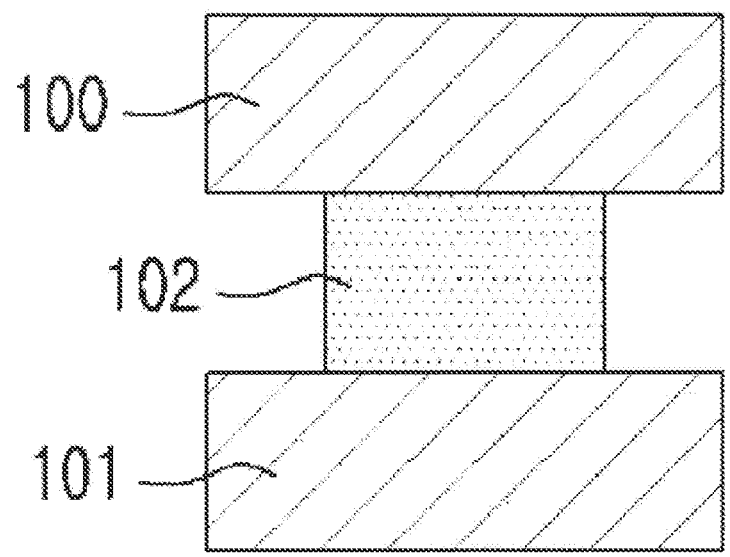
FIG. 1 is an electrical device according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Electronics printing technology is emerging as a new technology. In some areas, electronics printing technology is replacing the conventional exposure processes which requires expensive materials, complex etching processes and expensive equipment. This technology allows printing circuits on electronic circuit boards, and directly forming pattern with a desired substance without involving complicated processes.

In addition, electronics printing technology does not require the chemical substances used in the conventional etching processes. As such, electronics printing technology brings cleaner process and reduced cost, and increases competitiveness by reducing the number of processes and amount of materials required in conventional exposure process for metal etching.

In conventional electronics printing technology, during the production of interface products, patterns are printed on a base film of polyethylene terephthalate (PET) or polyimide (PI). The printed pattern is then sealed with an upper part film, such as a coverlay film, made from the same material as the base film.

Although PET and PI films are considered as stable, after long-term uses, especially uses under higher temperature or high humidity conditions, tearing and peeling often occur at the surface of the PET and PI films. This is due to the formation of oligomers in the film under the high temperature or the high humidity conditions. When the tearing and peeling take place, moisture ($H_2O$) enters the electrical devices thereby deteriorating the insulating properties and causing corrosion.

As a result, electrical devices using the PET or the PI films cannot achieve long-term reliability, especially when subjecting to high temperature or the high humidity conditions. This limits usefulness of the printed electrical devices in some areas where high temperature and the high humidity conditions are prevailing or unavoidable and long term stability is required. One of such areas is automobiles, as vehicles are often subjected to excessive heat and harsh environmental conditions, and are expected to last a relatively long time.

Therefore, in some embodiments, the instant specification provides articles and method to solve the problems described above.

In some embodiments, the instant specification is directed to a poly cyclohexylene dimethylene terephthalate (PCT) film having desirable stability under high temperature and high humidity environments. According to these embodiments, the PCT film has desirable physical properties such as high heat resistance and resistance to change upon long term exposure to high temperature and high humidity. By forming a pattern with a printing method on the PCT film, the goal of long-term reliability under high temperature and high humidity conditions is achieved. According to these embodiments, the instant specification is directed to a patterning formation method including printing a film base, a manufacturing method of an electrical device using the same, and a vehicular electrical device which exhibits long term stability under high temperature and high humidity conditions.

In some embodiments, the instant specification is directed to a combination of a base film or an upper film, such as a coverlay film including a PCT film and a electronic printing technology. Such combination prevents the tearing or peeling issues of the conventional electrical devices. According to these embodiment, the instant specification is directed to a patterning formation method of a printing method formed on a PCT base film, a manufacturing method of an electrical device using the same, and a vehicular electrical device.

In some embodiments, the instant specification is directed to a patterning formation method of a printing method formed on a film base, a manufacturing of method an electrical device using the same and a vehicular electrical device which have reduced manufacturing time and costs, and increased product reliability.

In some embodiments, the instant specification is directed to a patterning formation method including printing a pattern on a film base material, a manufacturing method of an electrical device using the same, and a vehicular electrical device manufactured using the electronic printing technologies.

According to the embodiments, by forming a printed electronic circuit with a structure including a PCT film on at least one side, oligomer formation and tearing/peeling caused by long term exposure to high temperature and high humidity conditions is suppressed. As such, the long-term reliability is ensured. In addition, according to the embodiments, a variety of electrical devices, such as interface products which have excellent quality compared with conventional products, can be manufactured. In addition, according to the embodiments, manufacturing time and product costs are reduced, and the product reliability is improved.

The instant specification includes, but not limited to, the following embodiments:

Embodiment 1

A vehicular electrical device for use as a vehicular LED module including a heat sink; and a metal layer formed on an upper side of the heat sink by any one printing method selected from inkjet, screen printing and gravure.

Embodiment 2

The vehicular electrical device according to embodiment 1, further including an insulating layer formed to cover the metal layer.

Embodiment 3

The vehicular electrical device according to embodiment 2, wherein the insulating layer is made of a PCT (Poly Cyclohexylene dimethylene terephthalate) material.

Embodiment 4

A vehicular electrical device for use as a vehicular touch module including: a printing type touch film having a connector connection part; a PCT film arranged on one surface of an upper part or lower part of the printing type touch film; a touch recognition part formed in a mesh type pattern on the PCT film and formed using a metal material by any one printing method selected from inkjet, screen printing and gravure printing methods; a touch outline part connected to the touch recognition part and formed at an edge part of the touch recognition part by a metal printing method; a carbon printing part formed by being electrically connected to the touch outline part; and an optical double-sided tape arranged on one side of the PCT film; wherein the optical double-sided tape is formed by an autoclave or UV processing method so as to be adhered to an injection object.

Embodiment 5

The vehicular electrical device according to embodiment 4, wherein the touch recognition part formed in the mesh type pattern is formed having a line width of 40 μm or less.

Embodiment 6

The vehicular electrical device according to embodiment 5, wherein the touch recognition part is formed by performing an offset method etching process in order to form the mesh pattern of the touch recognition part having a line width of 40 µm or less.

Embodiment 7

A vehicular electrical device for use as a vehicular touch module including: a PCT film; an ITO layer formed from an ITO material on an upper surface of the PCT film by any one printing method selected from inkjet, screen printing and gravure; a printing layer formed on an upper surface of the ITO layer by any one printing method selected from inkjet, screen printing and gravure; an optical double-sided tape adhered to an upper surface of the printing layer; and an adhesive tool adhered through the optical double-sided tape as a medium.

Embodiment 8

A vehicular electrical device for use as a vehicular bus bar cable including: an FFC (Flexible Flat Cable) type bus bar body formed from a PCT film; an FFC wire existing within the bus bar body; and a metal terminal arranged to be exposed at both ends of the bus bar body and being connected to the FFC wire.

Embodiment 9

The vehicular electrical device according to embodiment 8, wherein the bus bar body is formed from a multi-layer in which two or more PCT films having a constant length and width are stacked, and each layer is bonded by an adhesive layer.

Embodiment 10

The vehicular electrical device according to embodiment 9, wherein a metal plate having a rivet hole on a side where the FFC wire is exposed is joined on the bus bar body formed from a multi-layer of two or more PCT films, and bolted to the rivet hole side so as to be capable of being connected to another cable.

Embodiment 11

The vehicular electrical device according to embodiment 8, wherein the FFC wire has a wire thickness of 30 µm to 100 µm.

Embodiment 12

A vehicular electrical device for use as a vehicular bus bar cable including: an FFC (Flexible Flat Cable) type bus bar body formed from a PCT film; and a metal printing layer formed on an upper part of the FFC type bus bar body; wherein the metal printing layer has a function of any one of a passive element, an active element, a fuse element and a semiconductor element.

Embodiment 13

A vehicular electrical device for use as a vehicular hybrid flexible cable including: a PCT film; a metal ink printing line formed in a line shape in a longitudinal direction, located on one surface of the PCT film and formed by printing a metal material by any one printing method selected from inkjet, screen printing and gravure; and an FFC wire line formed in a line shape in a longitudinal direction, located on another surface of the PCT film and including an FCC wire.

Embodiment 14

The vehicular electrical device according to embodiment 13, further including a crosstalk prevention space for preventing signal crosstalk between the metal ink printing line and the FFC wire line arranged between the metal ink printing line and the FFC wire line, wherein the metal ink printing line and the FFC wire line are formed so as to be positioned on both sides of the crosstalk prevention space.

Embodiment 15

The vehicular electrical device according to embodiment 13, further including a crosstalk prevention dummy line for preventing signal crosstalk between the metal ink printing line and the FFC wire line arranged between the metal ink printing line and the FFC wire line.

Embodiment 16

The vehicular electrical device according to embodiment 15, wherein the crosstalk prevention dummy line is formed by any one group of printing methods selected from inkjet, screen printing, and gravure.

Embodiment 17

The vehicular electrical device according to embodiment 15, wherein the crosstalk prevention dummy line is a metal layer or a semiconductor layer.

Embodiment 18

A manufacturing method of a vehicular electrical device including: forming a pattern layer on an upper surface of a PCT film used as a base film by printing a metal material or a semiconductor material by any one printing method selected from inkjet, screen printing, and gravure; adhering a coverlay film to the upper surface of the pattern layer; and integrally bonding the base film, the pattern layer and the coverlay film with an adhesive layer including a thermosetting adhesive as a medium.

Embodiment 19

A manufacturing method of a vehicular electrical device including: forming a pattern layer on an upper surface of a PCT film used as a base film by printing a metal material or a semiconductor material by any one printing method selected from inkjet, screen printing, and gravure; adhering a coverlay film to the upper surface of the pattern layer; and integrally bonding the base film, the pattern layer and the coverlay film with an adhesive layer including a thermoplastic adhesive as a medium.

Embodiment 20

A manufacturing method of an electrical device including: (A) a step of arranging any one film selected from a PI film, a PEN film and a PCT film as a base film; (B) a step of forming a pattern layer on an upper surface of the base film by printing a metal material or a semiconductor material by any one printing method selected from inkjet, screen printing and gravure; (C) a step of arranging and bonding together a PCT film as a coverlay film so as to cover the pattern layer; (D) a step of forming a silk printing layer on the upper surface of the PCT film bonded as the coverlay film by a silk printing method; (E) a step of forming an outline shape by processing an outline with a mold or laser processing on the resultant product after the step (D); and (F) a step of bonding an aluminum plate for a heat releasing function to a lower part of the resultant product after the step (E).

Embodiment 21

A patterning formation method of a printing method formed on a film base including: forming a metal layer on an upper surface of a PCT film used as a base film by printing a metal material by any one printing method selected from inkjet, screen printing and gravure.

Embodiment 22

The patterning formation method of a printing method formed on the film base according to embodiment 21, wherein the metal material is any one selected from gold, silver, copper, platinum, carbon, nickel, indium and tin or a mixed alloy of two or more selected from gold, silver, copper, platinum, carbon, nickel, indium and tin.

Embodiment 23

A patterning formation method of a printing method formed on a film base including: forming an insulation layer on an upper surface of a PCT film used as a base film by printing an insulating material by any one printing method selected from inkjet, screen printing and gravure.

Embodiment 24

The patterning formation method of a printing method formed on the film base according to embodiment 23, wherein the insulating film material is any one selected from $SiO_2$, $Si_3N_4$, $P_2O_5$, $B_2O_3$, and silicone.

Embodiment 25

A patterning formation method of a printing method formed on a film base including: forming a semiconductor layer (active layer) on an upper surface of a PCT film used as a base film by printing a semiconductor material by any one printing method selected from inkjet, screen printing and gravure.

Embodiment 26

The patterning formation method of a printing method formed on the film base according to embodiment 25, wherein the semiconductor material is any one selected from carbon, silicon, germanium, gallium and arsenic or a mixed compound of two or more selected from carbon, silicon, germanium, gallium and arsenic.

Embodiment 27

A patterning formation method of a printing method formed on a film base including: arranging a PI (Poly Imide) film or a PEN (Poly Ethylene Napthalene) film as a base film on a lower part, arranging a PCT film as a coverlay film on an upper part; and forming a silk printing layer on an upper surface of the PCT film by a silk printing method so as to use the silk printing layer in the arrangement of electronic components.

Embodiment 28

A patterning formation method of a printing method formed on a film base including: arranging a PCT film as a base film on a lower part; arranging a PCT film as a coverlay film on an upper part; and forming a silk printing layer on an upper surface of the PCT film used as the coverlay film by a silk printing method so as to use the silk printing layer in the arrangement of electronic components.

Embodiment 29

The patterning formation method of the printing method formed on the film base according to embodiment 27 or embodiment 28, further including forming a metal layer on the upper surface of the base film by printing a metal material by any one printing method selected from inkjet, screen printing and gravure.

Electrical Device Including a Printed Layer

In some embodiments, the instant specification is directed to an electrical device including a printed layer.

In some embodiments, electrical device includes a base film and a printed layer on the base film.

In some embodiments, the base film includes a poly cyclohexylene dimethylene terephthalate (PCT) film.

In some embodiments, the printed layer includes a metal layer, a semiconductor layer, an insulating layer, or combinations thereof.

In some embodiments, the printed layer printed is printed by an inkjet printing, a screen printing, a gravure printing or combinations thereof.

In some embodiments, the electrical device further includes a coverlay film on the base layer and the printed layer. According to these embodiments, the base layer and the coverlay film fully or partially seals the printed layer from the outside, thereby provides protection or insulation to the printed layer.

Referring to FIG. 1, in some embodiments, a PCT film formed by a poly cyclohexylene dimethylene terephthalate material is used as the base film 101. A metal layer 102 including a metal material is formed on an upper surface of the PCT film. The metal layer 102 is printed on the base film 101 by an inkjet printing, a screen printing, a gravure printing, or combinations thereof. As detailed above, the PCT material is resistant to high temperature and high humidity conditions. Therefore, characteristics of the PCT material is changed by moisture when subjected to high temperature and high humidity conditions.

In some embodiments, the metal of the metal layer 102 is gold, silver, copper, platinum, carbon, nickel, indium or tin, or an alloy of two or more of these metals. In some embodiments, silver is the main metal material in the metal layer 102. In some embodiments, the metal layer 102 includes an alloy of silver and copper.

In some embodiments, a coverlay film 100 for protecting the metal layer 102 includes a PCT film, a PI film, a PEN film or combinations thereof.

Figure 2:
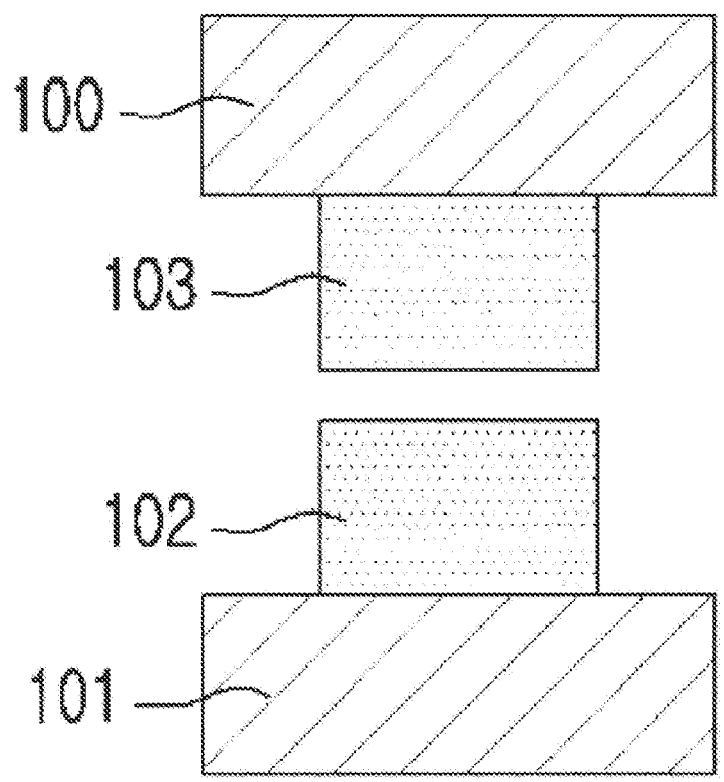
FIG. 2 is an electrical device according to some embodiments.

Referring to FIG. 2, in some embodiments, the electrical device further includes an insulating layer 103 between the metal layer 102 and the coverlay film 100. In some embodiments, the insulating layer 103 is formed by printing an insulating material on the base film 101 and the metal layer 102. In some embodiments, the insulating layer is printed by an inkjet printing, a screen printing, a gravure printing, or combinations thereof.

Figure 3:
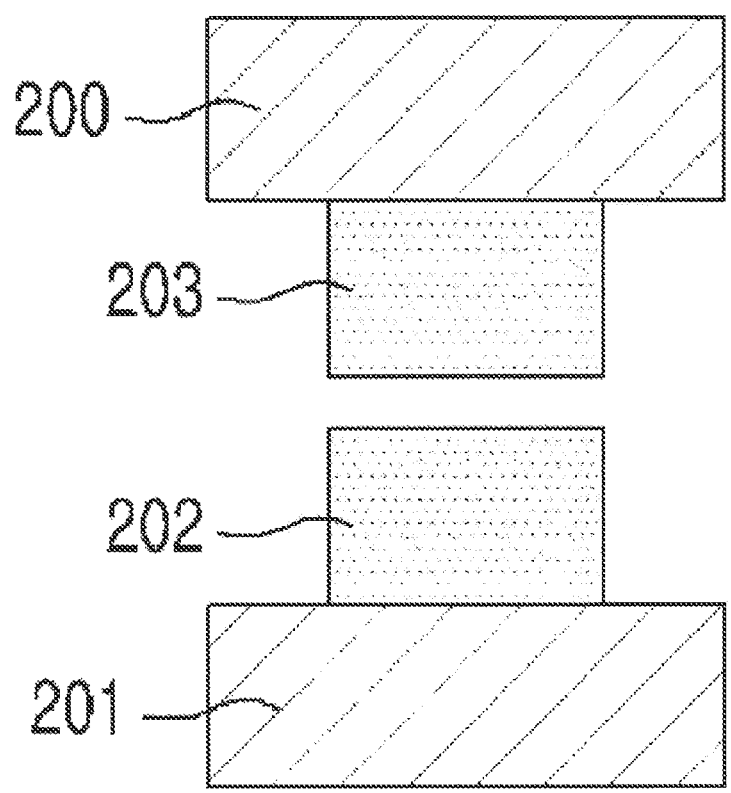
FIG. 3 is an electrical device according to some embodiments.

Referring to FIG. 3, in some embodiments, the insulating layer 202 is formed by printing an insulating film material using any one printing method selected from inkjet, screen printing and gravure on an upper surface of a PCT film which is used as a base film 201 as shown in FIG. 3.

In some embodiments, an insulating material of the insulating film 102 or 202 includes $SiO_2$, $Si_3N_4$, $P_2O_5$, $B_2O_3$, silicone, or combinations thereof.

In some embodiments, the metal layer 203 is formed by printing a metal material an inkjet printing, a screen printing, a gravure printing or combinations thereof on an upper surface of the insulating layer 202.

In some embodiments, the electrical device further includes a coverlay film 202 for protecting the metal layer 203. In some embodiments, the coverlay film 200 includes a PCT film, a PI film a PEN film or combinations thereof.

Figure 4:
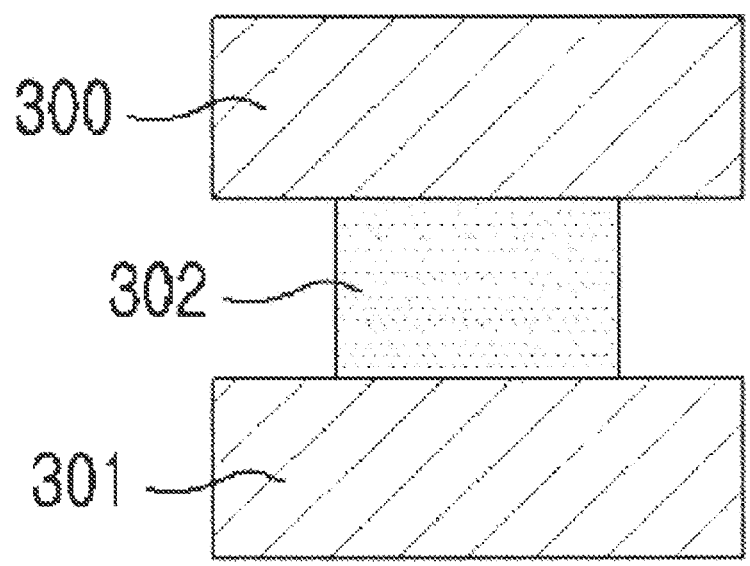
FIG. 4 is an electrical device according to some embodiments.

Referring to FIG. 4, in some embodiments, the electrical device includes a base layer 301, and a semiconductor layer (active layer) 302. In some embodiments, the semiconductor layer (active layer) 302 is formed by printing a semiconductor material on an upper surface of the base layer 301. In some embodiments, the semiconductor layer (active layer) 302 is printed by an inkjet printing, a screen printing, a gravure printing or combinations thereof. In some embodiments, the base layer 301 includes a PCT film.

In some embodiments, the semiconductor material includes carbon, silicon, germanium, gallium, arsenic or combinations thereof.

In some embodiments, the electrical device further includes a coverlay film 300 for protecting the semiconductor layer 302. In some embodiments, the coverlay film 300 includes a PCT film, a PI film, a PEN film, or combinations thereof.

Figure 5:
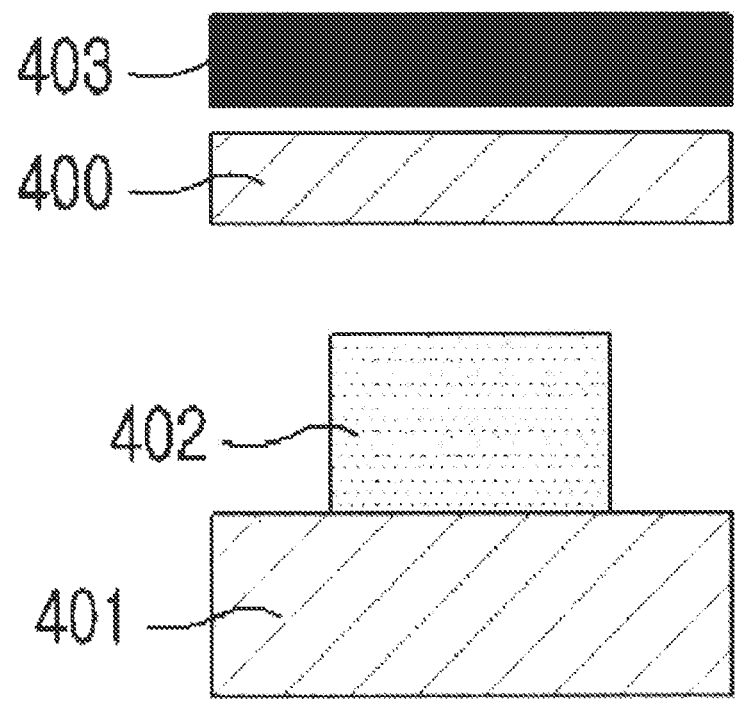
FIG. 5 is an electrical device according to some embodiments.

Referring to FIG. 5, in some embodiments, the electrical device is formed by arranging a poly imide (PI) film or a poly ethylene naphthalene (PEN) film on a lower part as a base film 401, arranging a PCT film on an upper part as the coverlay film 400, and forming a silk printing layer 403 by a silk printing method on an upper surface of the coverlay film 400.

In some embodiments, the silk printing layer 403 is formed in a pattern for use in arrangement of various electronic components.

In some embodiments, the electrical device further includes a metal layer 402 between the base film 401 and the coverlay film 400. In some embodiments, the metal layer 402 is formed by printing a metal material. In some embodiments, the metal material is printed by an inkjet printing, a screen printing, a gravure printing, or combinations thereof. In some embodiments, the metal layer 402 is printed on an upper surface of the base film 401. In some embodiments, the metal layer 402 is printed on a lower surface of the coverlay film 400.

Figure 6:
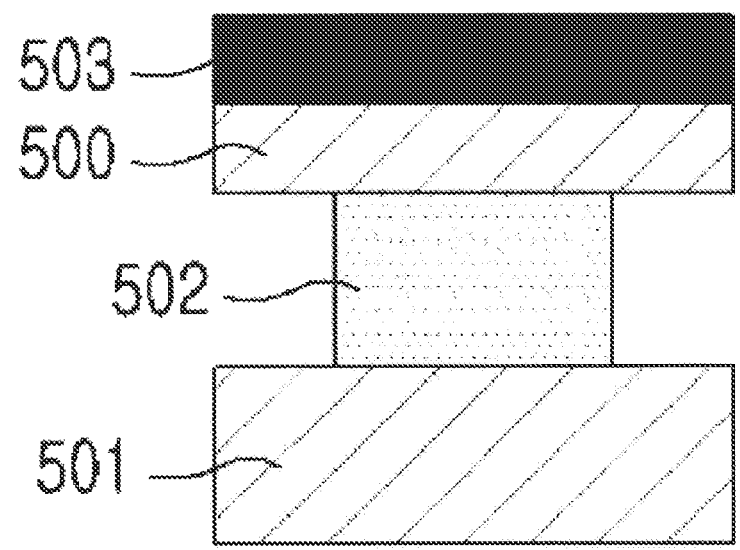
FIG. 6 is an electrical device according to some embodiments.

Referring to FIG. 6, the electrical device is formed by arranging a PCT film on a lower part as a base film 501, arranging a PCT film on an upper part as the coverlay film 500, and forming a silk printing layer 503 by a silk printing method on an upper surface of a PCT film.

In some embodiments, the silk printing layer 503 is formed in a pattern for use in the arrangement of various electronic components.

In some embodiments, the metal layer 502 between the base film 501 and the coverlay film 500 is formed by printing a metal material. In some embodiments, the metal material is printed by an inkjet printing, a screen printing, a gravure printing, or combinations thereof.

In some embodiments, the metal layer 502 is formed by printing on an upper surface of the base film 501. In some embodiments, the metal layer 502 is formed by printing on a lower surface of the coverlay film 500.

Figure 7:
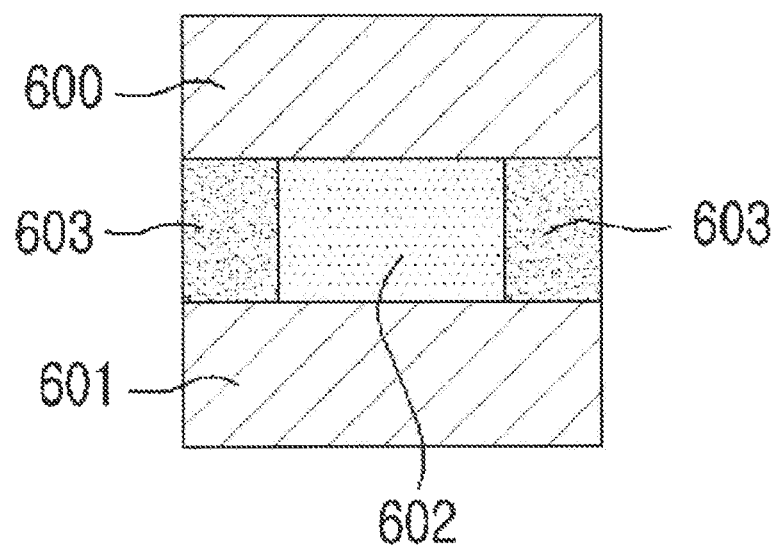
FIG. 7 is an electrical device according to some embodiments.

In some embodiments, the electrical device is an electrical tool. Referring to FIG. 7, the electrical device is formed by forming a PCT film used as a base film 601, forming a pattern layer 602 by printing a metal material or a semiconductor material on an upper surface of the film an inkjet printing, a screen printing, a gravure printing or combinations thereof, attaching a coverlay film 600 to an upper surface of the pattern layer 602, and integrally adhering the base film 601, the pattern layer 602 and the cover lay film 600 through an adhesive layer 603.

In some embodiments, the adhesive layer includes a thermosetting adhesive or a thermoplastic adhesive.

Method of Manufacturing Electrical Device

In some embodiments, the instant specification is directed to a method for manufacturing a device which is used as an electrical tool.

In some embodiments, the method includes a patterning formation method includes a printing method forming on the film base, such as those described above.

Figure 8:
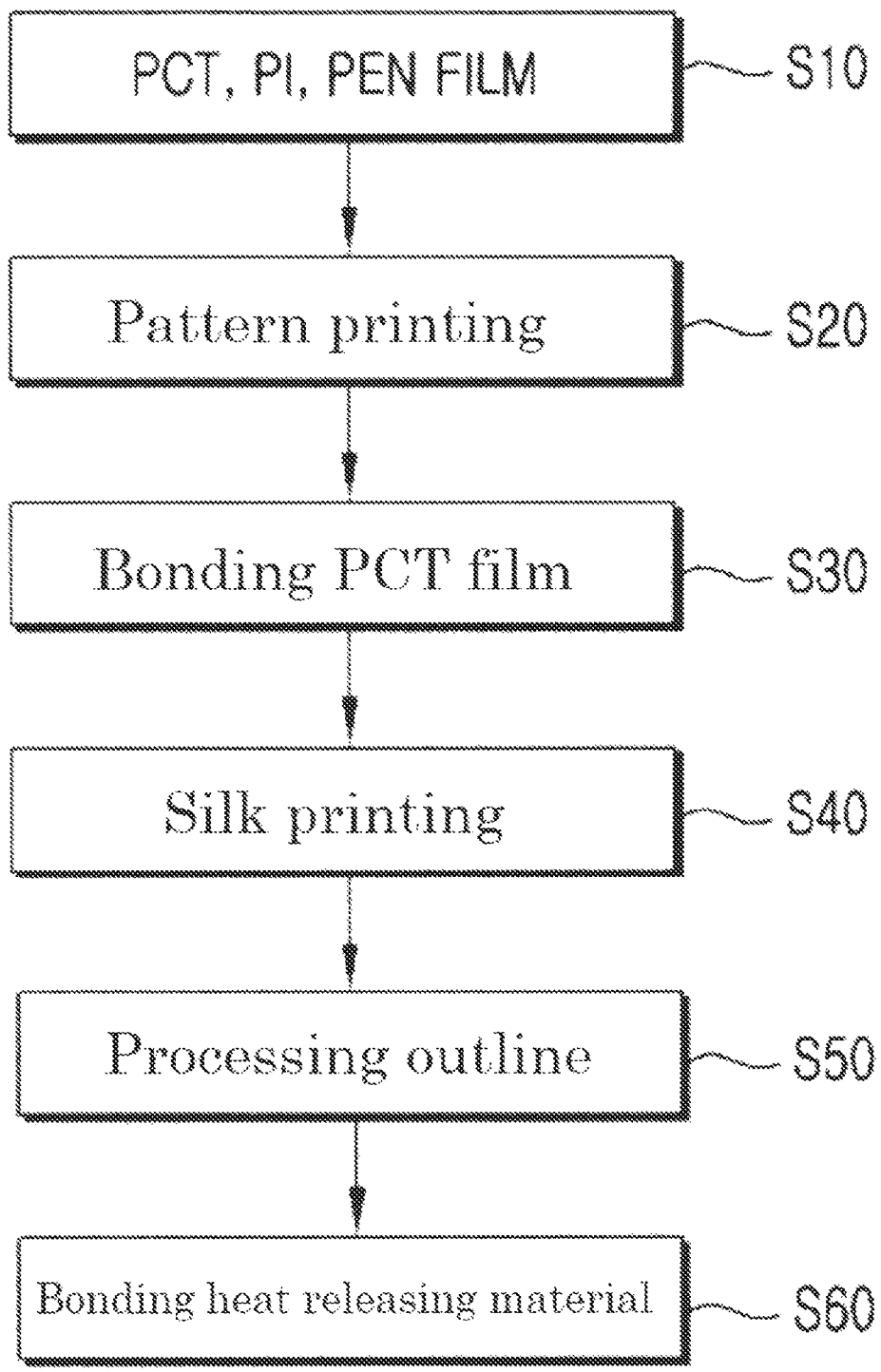
FIG. 8 is a manufacturing method of an electrical device according to some embodiments.

Referring to FIG. 8, the method includes a base film providing step (S10), a pattern printing step (S20), a coverlay film bonding step (S30), a silk printing step (S40), an outline processing step (S50), and a heat releasing material bonding step (S60) is a technique which can improve and replace the manufacturing method of conventional FPCB.

In some embodiments, the base film providing step (S10) includes providing a PI film, a PEN film, a PCT film or combinations thereof as a base film.

In some embodiments, the pattern printing step (S20) includes forming a pattern layer by printing a metal material or a semiconductor material on an upper surface of the base film. In some embodiments, the metal material or the semiconductor material is printed by an inkjet printing, a screen printing, a gravure printing, or combinations thereof.

In some embodiments, the coverlay film bonding step (S30) includes providing a PCT film, and bonded the PCT film as a coverlay film so as to cover the pattern layer.

In some embodiments, one of the base layer or the coverlay film includes a PI film or a PEN film. According to these embodiment, the other of the base layer or the coverlay film includes a PCT film.

In some embodiments, the silk printing step (S40) includes forming a silk printing layer by a silk printing method on an upper surface of the PCT film which is bonded by the coverlay film.

In some embodiments, a surface treatment process is performed on the resultant product after the silk printing step.

In some embodiments, the outline processing step (S50) comprises processing an outline on the product of the silk printing step (S40).

In some embodiments, the outline processing includes processing with a metal mold or a laser to forms an external shape.

In some embodiments, the heat releasing material bonding step (S60) includes bonding a heat releasing sheet having a heat releasing function on a lower part of the product of the outline processing step.

In some embodiments, the heat releasing sheet includes an aluminum plate. When the aluminum plate is used, heat releasing efficiency can be achieved.

Although the instant specification describes the patterning formation method including printing on a film base in reference to vehicular electrical devices, one of ordinary skill in the art would understand that the method can be used to manufacture various other interface products, especially interface products that need to operate in high temperature and high humidity environments for an extended amount of time.

In some embodiments, the electrical device is a vehicular electrical device. In some embodiments, the vehicular electrical device is a vehicular electrical device connected to a vehicular lamp LED module, a vehicular metal mesh type touch module, a vehicular ITO type touch module, a flexible flat cable (FFC) type bus bar cable, or a FFC type hybrid flexible cable for vehicular rear camera interfaces and the like. The above exemplary vehicular electrical devices as well as production methods thereof will be detailed below.

Vehicular Electrical Device for Use as a Vehicular LED Module

In some embodiments, the instant specification is directed to a vehicular electrical device for use as a vehicular LED module.

In some embodiments, the vehicular electrical device includes a heat sink, and a metal layer on an upper side of the heat sink.

In some embodiments, the metal layer is printed an inkjet printing, a screen printing, a gravure printing or combinations thereof.

In some embodiments, the vehicular electrical device further includes an insulating layer on covering the metal layer.

In some embodiments, the insulating layer is made of a poly cyclohexylene dimethylene terephthalate (PCT) material.

Figure 9A:
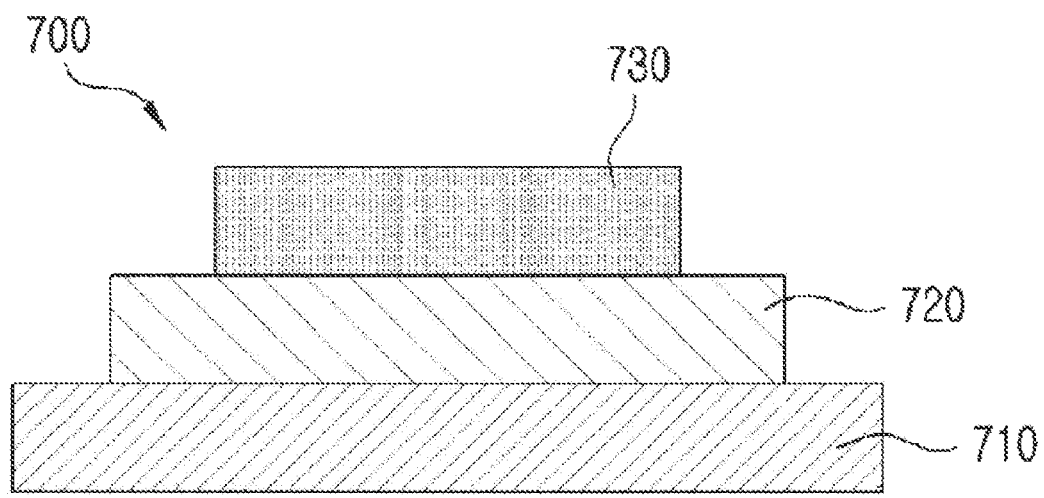
FIG. 9(a) is a vehicular electrical device for use as a vehicular LED module according to some embodiments.
Figure 9B:
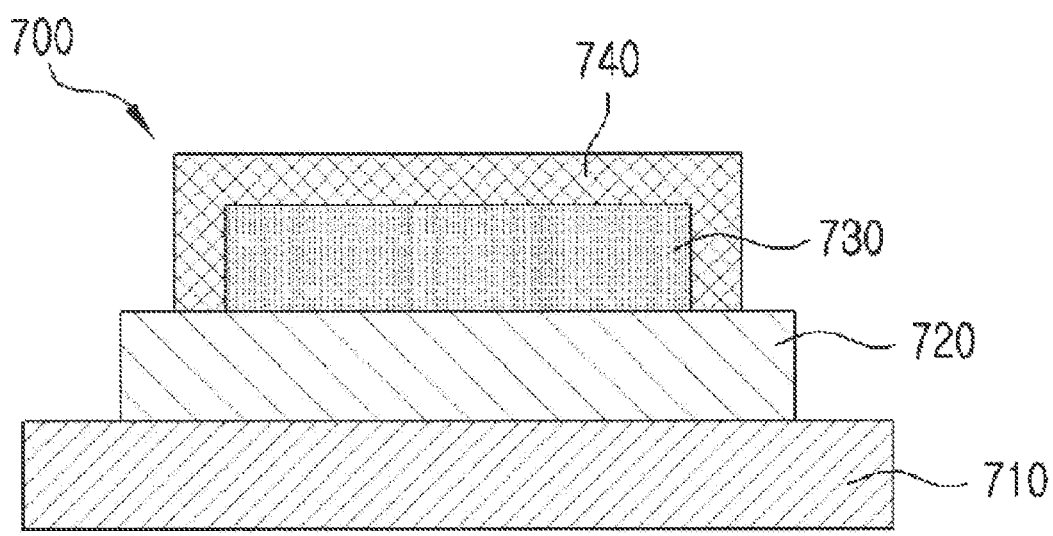
FIG. 9(b) is a vehicular electrical device for use as a vehicular LED module according to some embodiments.

FIG. 9(a) and FIG. 9(b) show exemplary structures of a vehicular electrical device for use as a vehicular lamp LED module.

Referring to FIG. 9(a) and FIG. 9(b), in some embodiments, the vehicular electrical device is used as a vehicular lamp LED module 700. In some embodiments, the vehicular lamp LED module 700 includes a heat releasing plate 710, an insulating layer 720 on an upper surface of the heat releasing plate, and a metal layer 730 on an upper surface of the insulating layer 720. In some embodiments, the insulating layer 720 or the metal layer 730 is formed printing. In some embodiments, the insulating layer 720 or the metal layer 730 is printed by an inkjet printing, a screen printing, a gravure printing or combinations thereof.

In some embodiments, the vehicular lamp LED module 700 further includes an insulating layer 740 that covers the metal layer 730.

In some embodiments, the insulating layer 720 or 740 is formed by printing a poly cyclohexylene dimethyl terephthalate (PCT) material, or formed by bonding PCT films.

In some embodiments, the metal layer 730 is used for mounting an LED and supplying power to the LED.

Vehicular Electrical Device for Use as a Vehicular Touch Module

In some embodiments, the instant specification is directed to a vehicular electrical device for use as a vehicular touch module.

In some embodiments, the vehicular electrical device for use as a vehicular touch module includes a printing type touch film having a connector connection part, a PCT film arranged on one surface of an upper part or lower part of the printing type touch film, a touch recognition part formed in a mesh type pattern on the PCT film and formed from a metal material by an inkjet printing, a screen printing or a gravure printing, a touch outline part connected to the touch recognition part and formed at an edge part of the touch recognition part by a metal printing method, a carbon printing part formed by being electrically connected to the touch outline part, and an optical double-sided tape arranged on one side of the PCT film, wherein the optical double-sided tape is formed by an autoclave or UV processing method so as to be adhered to an injection object.

In some embodiments, the touch recognition part formed in the mesh type pattern has a line width of 40 μm or less.

In some embodiments, the touch recognition part is formed by an offset method etching process to form the mesh pattern.

In some embodiments, the vehicular electrical device for use as a vehicular touch module includes a PCT film, an ITO layer formed from an ITO material on an upper surface of the PCT film formed by an inkjet printing, a screen printing, a gravure printing or combinations thereof, a printing layer formed on an upper surface of the ITO layer by an inkjet printing, a screen printing, a gravure printing, or combinations thereof, an optical double-sided tape adhered to an upper surface of the printing layer, and an adhesive tool adhered through the optical double-sided tape as a medium.

Figure 10A:
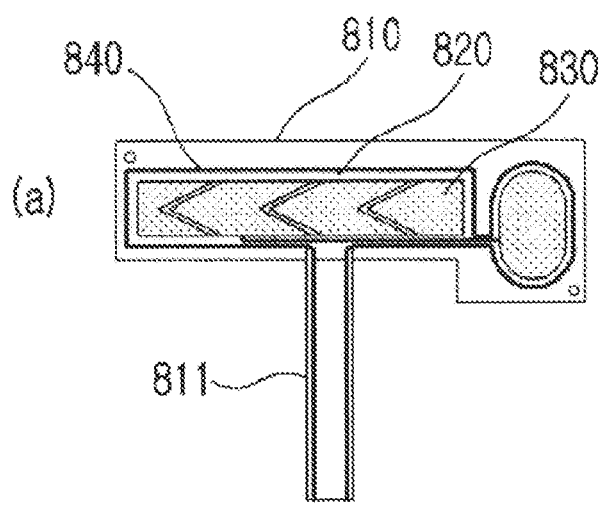
FIG. 10(a) is a vehicular electrical device for use as a vehicular metal mesh type touch module according to some embodiments.
Figure 10B:
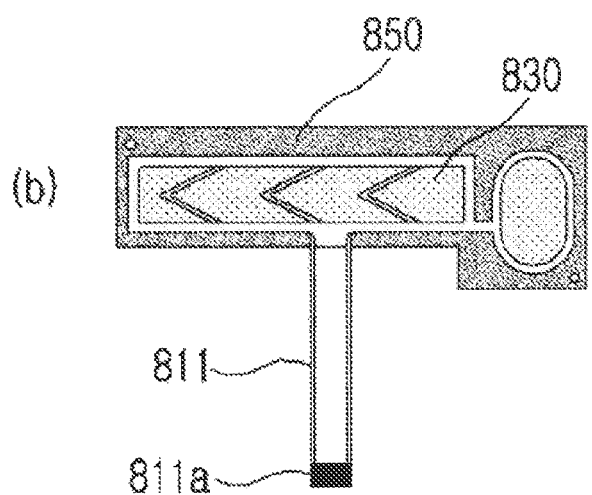
FIG. 10(b) is a vehicular electrical device for use as a vehicular metal mesh type touch module according to some embodiments.
Figure 10C:
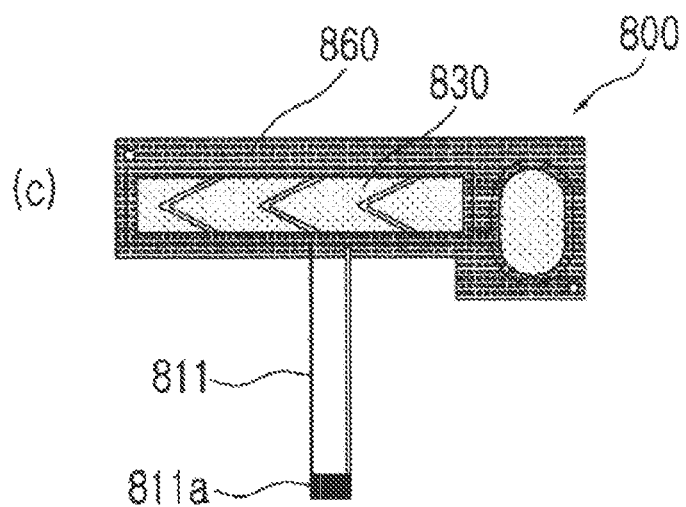
FIG. 10(c) is a vehicular electrical device for use as a vehicular metal mesh type touch module according to some embodiments.

FIG. 10(a) to FIG. 10(c) show a vehicular electrical device used as a vehicular metal mesh type touch module.

Referring to FIG. 10(a) to FIG. 10(c), the vehicular electrical device is used as a vehicular metal mesh type touch module 800. In some embodiments, the vehicular electrical device includes a printing type touch film 810 which has a connector connection part 811, a PCT film 820 arranged on one surface (either an upper part or a lower part) of the printing type touch film, a touch recognition part 830 formed above the PCT film in a mesh type pattern, a touch outline part 840 connected to the touch recognition part and formed at the outermost edge of the touch recognition part by a metal printing method, a carbon printing part 850 formed by electrically connecting to the touch outline part, and an optical double-sided tape 860 which is arranged on one surface of the PCT film. In some embodiments, the mesh type pattern is printed by an inkjet printing, a screen printing, a gravure printing, or combinations thereof.

In some embodiments, the optical double-sided tape 860 is formed by an autoclave or a UV processing method so as to adhere to an injected substance.

In some embodiments, a connector part 811a connecting to the touch outline part 840 is formed on the connector connection part 811 and at an end part of the connector connection part 811 so as to be capable of being directly connected to a driver IC. In some embodiments, the connector part is formed by a carbon printing layer.

Figure 11:
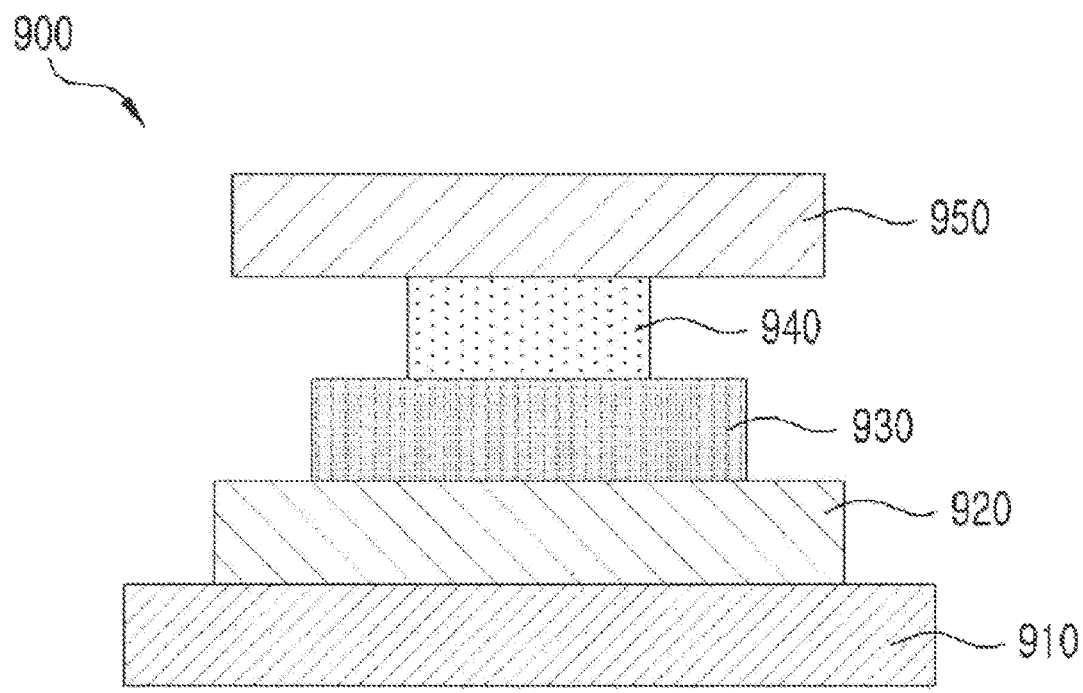
FIG. 11 is a vehicular electrical device for use as a vehicular ITO according to some embodiments.

FIG. 11 shows a vehicular electrical device for use as a vehicular ITO type touch film module.

Referring to FIG. 11, the vehicular electrical device is a vehicular ITO touch film module 900. In some embodiments, the vehicular electrical device includes a PCT film 910 as a base, an ITO layer 920 formed on the upper surface of the PCT film by an ITO material, a printing layer 930 formed on an upper surface of the ITO layer, an optical double-sided tape 940 attached to the upper surface of the printing layer, and an adhesive tool 950 attached via the optical double-sided tape as a medium. In some embodiments, the ITO layer 920 or the printing layer 930 is printed by an inkjet printing, a screen printing, a gravure printing, or combinations thereof.

In some embodiments, the printing layer 930 includes a metal layer, an insulating layer, a semiconductor layer, or combinations thereof.

In some embodiments, the printing layer 930 includes the metal layer, and the metal layer is arranged in one or more layers and has a function for supplying a current.

In some embodiments, the printing layer 930 includes the insulating layer, and the insulating layer is arranged in one or more layers and has an electrical insulating function. In some embodiments, the insulating layer is interposed between two metal layers or between a metal layer and a semiconductor layer, thereby insulating the layers.

In some embodiments, the printing layer 930 includes the semiconductor layer, and the semiconductor layer functions as a semiconductor element, such as a diode or transistor.

In some embodiments, the optical double-sided tape 940 functions to attach layers both sides thereof while maintaining light transmittance, or functions to attach an intervening part or film.

Vehicular Electrical Device for Use as a Vehicular Bus Bar Cable

In some embodiments, the instant specification is directed to a vehicular electrical device for use as a vehicular bus bar cable.

In some embodiments, the vehicular electrical device for use as a vehicular bus bar cable includes a flexible flat cable (FFC) type bus bar body formed from a PCT film, an FFC wire existing within the bus bar body, and a metal terminal arranged to be exposed at both ends of the bus bar body and being connected to the FFC wire.

In some embodiments, the bus bar body has multi-layer structure in which two or more PCT films having a constant length and width are stacked, and each layer is bonded by an adhesive layer.

In some embodiments, a metal plate having a rivet hole on a side where the FFC wire is exposed is joined on the bus bar body formed from a multi-layer of two or more PCT films, and bolted to the rivet hole side so as to be capable of being connected to another cable.

In some embodiments, the FFC wire has a wire thickness ranging from 30 μm to 100 μm.

In some embodiments, the vehicular electrical device for use as a vehicular bus bar cable includes a flexible flat cable (FFC) type bus bar body formed from a PCT film, and a metal printing layer formed on an upper part of the FFC type bus bar body, wherein the metal printing layer has a function of any one of a passive element, an active element, a fuse element or a semiconductor element.

Figure 12:
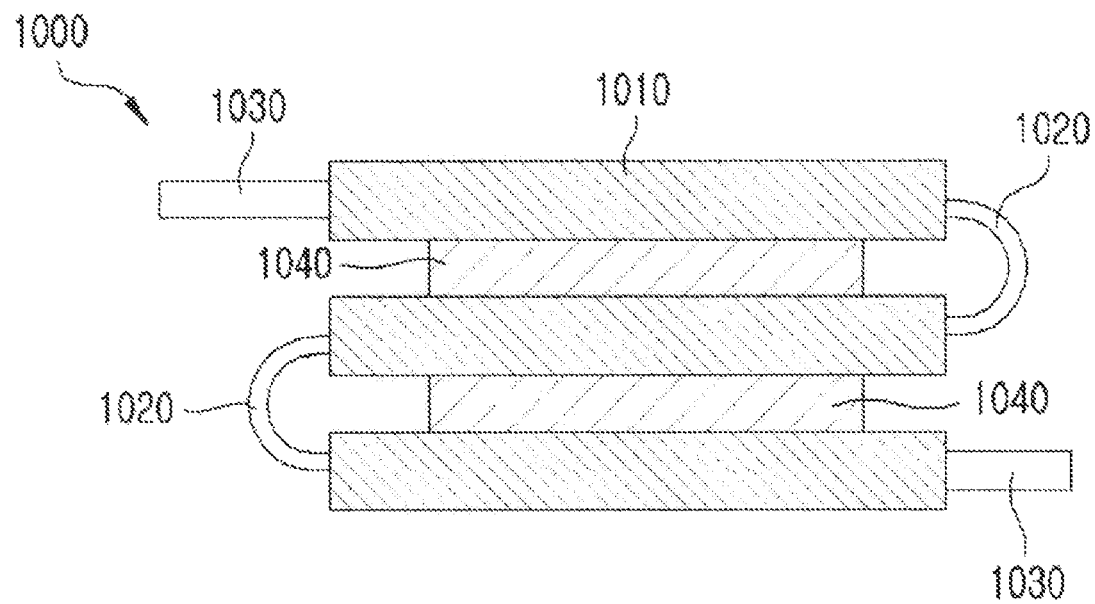
FIG. 12 is a diagram showing a vehicular electrical device for use as a vehicular FFC type bus bar cable according to some embodiments.
Figure 13:
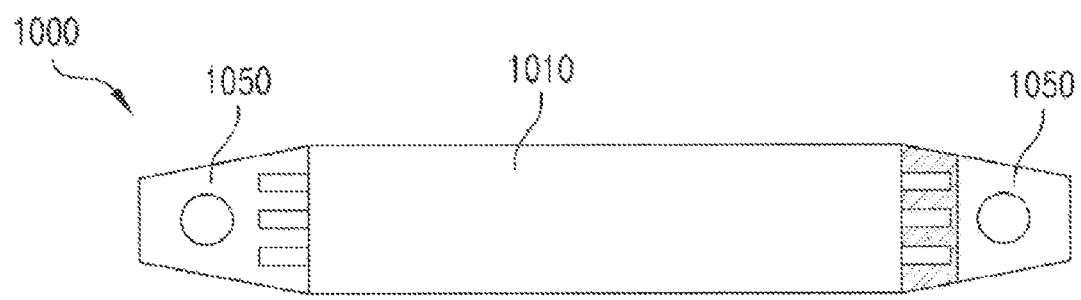
FIG. 13 is a vehicular electrical device for use as a vehicular FFC type bus bar cable according to some embodiments.
Figure 14:
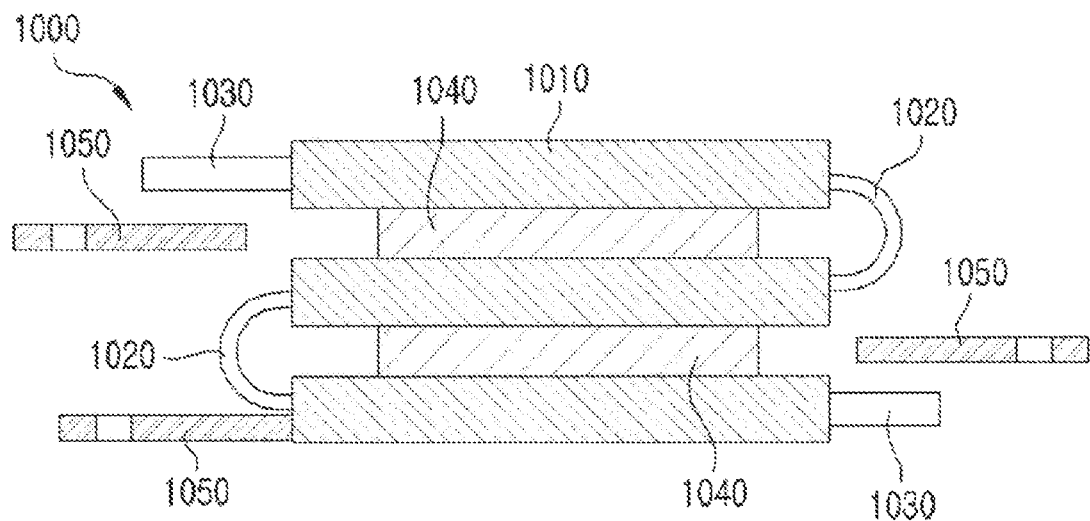
FIG. 14 is a vehicular electrical device for use as a vehicular FFC type bus bar cable according to some embodiments.

FIG. 12 to FIG. 14 show an exemplary vehicular electrical device for use as a vehicular FFC type bus bar cable.

Referring to FIG. 12 to FIG. 14, the vehicular electrical device is used as a vehicular FFC type bus bar cable 1000. In some embodiments, the vehicular electrical device includes an flexible flat cable (FFC) type bus bar body 1010 formed from a PCT film, an FFC wire 1020 arranged inside the bus bar body, and a metal terminal 1030 arranged and exposed at both ends of the bus bar body and is connected to the FFC wire.

In some embodiments, the bus bar body 1010 is formed in multi-layers in which two or more PCT films having a constant length and width are stacked, and each layer is bonded together by an adhesive layer 1040.

In some embodiments, a metal plate 1050 which has a rivet hole on the side where the FFC wire 1020 is exposed is joined on the bus bar main body 1010 is formed by multiple layers of PCT films. In some embodiments, the metal plate 150 is used to connect to other cables via a bolt to the rivet hole side.

In some embodiments, the vehicular electrical device includes an FFC type bus bar body formed from a PCT film and a metal printing layer formed on an upper part of the FFC type bus bar body.

In some embodiments, the metal printing layer is configured to function as a passive element, an active element, a fuse element, a semiconductor element, or combinations thereof.

Vehicular Electrical Device for Use as a Vehicular Hybrid Flexible Cable

In some embodiments, the instant specification is directed to a vehicular electrical device for use as a vehicular hybrid flexible cable.

In some embodiments, the vehicular electrical device for use as a vehicular hybrid flexible cable includes a PCT film, a metal ink printing line formed in a line shape in a longitudinal direction, located on one surface of the PCT film and formed by printing a metal material by an inkjet printing, a screen printing, a gravure printing or combinations thereof, and an FFC wire line formed in a line shape in a longitudinal direction, located on another surface of the PCT film and including an FCC wire.

In some embodiments, the vehicular electrical device further include a crosstalk prevention space for preventing signal crosstalk between the metal ink printing line and the FFC wire line and is arranged between the metal ink printing line and the FFC wire line, wherein the metal ink printing line and the FFC wire line are formed so as to be positioned on both sides of the crosstalk prevention space.

In some embodiments, the vehicular electrical device further includes a crosstalk prevention dummy line for preventing signal crosstalk between the metal ink printing line and the FFC wire line.

In some embodiments, the crosstalk prevention dummy line is formed by a printing method. In some embodiments, the crosstalk prevention dummy line is printed by an inkjet printing, a screen printing, a gravure printing or combinations thereof.

In some embodiments, the crosstalk prevention dummy line is a metal layer or a semiconductor layer.

Figure 15:
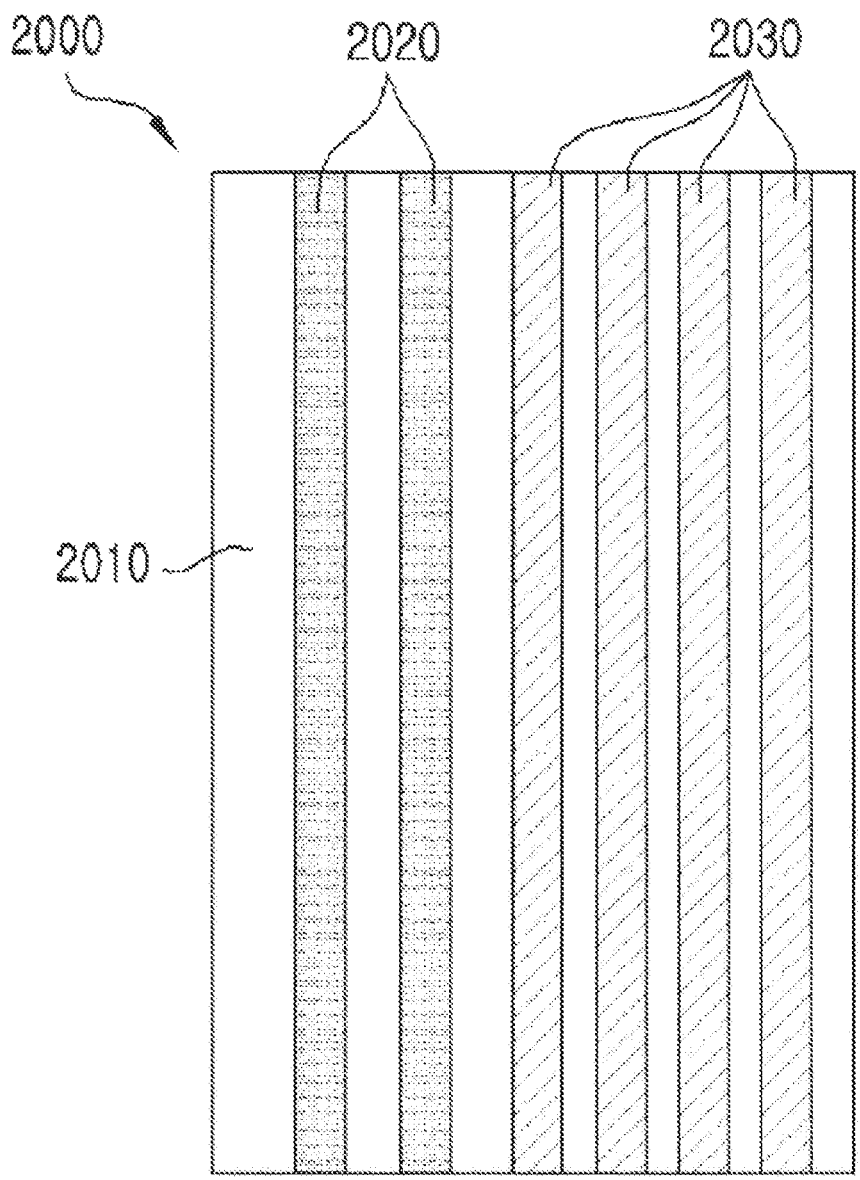
FIG. 15 is a vehicular electrical device for use as a vehicular rear camera FFC type hybrid flexible cable according to some embodiments.
Figure 16:
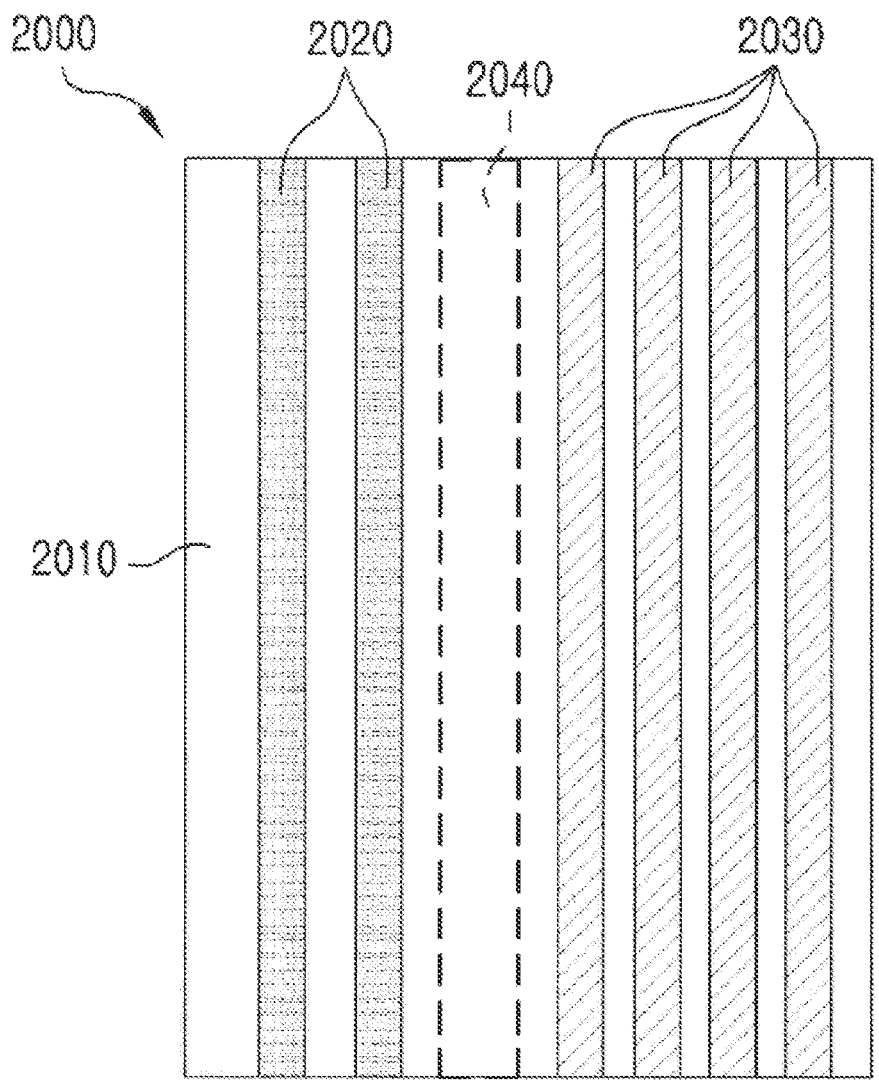
FIG. 16 is a vehicular electrical device for use as a vehicular rear camera FFC type hybrid flexible cable according to some embodiments.
Figure 17:
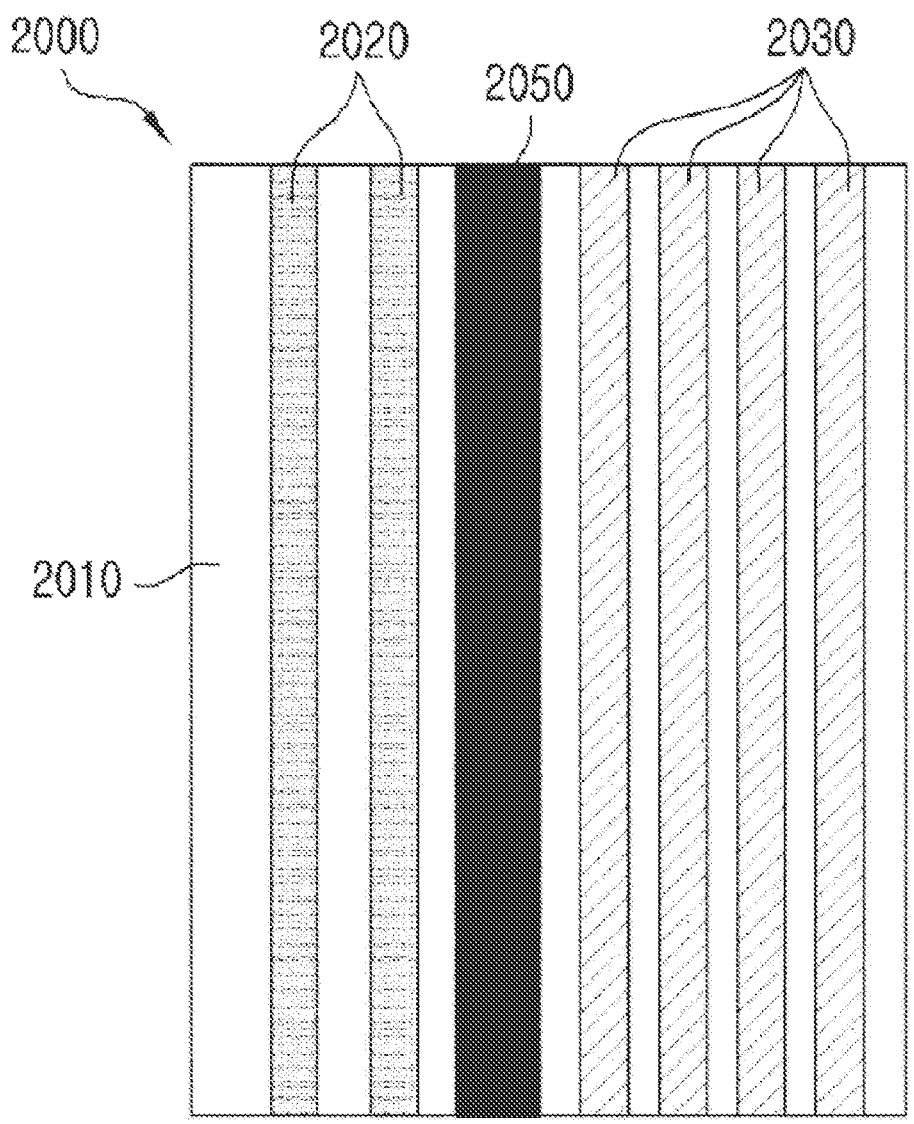
FIG. 17 is a vehicular electrical device for use as a vehicular rear camera FFC type hybrid flexible cable according to some embodiments.

FIG. 15 to FIG. 17 show a vehicular electrical device used as a vehicular rear camera FFC type hybrid flexible cable.

Referring to FIG. 15, in some embodiments, the vehicular electrical device is used as a vehicle rear camera FFC type hybrid flexible cable 2000. In some embodiments, the vehicular electrical device includes a PCT film 2010 arranged as a base, a metal ink printing line 2020 located on one side above one surface of the PCT film and is formed in a line shape in a longitudinal direction, and an FFC wire line 2030 which is located on the other side of the one surface mentioned above of the PCT film and is formed in a line shape in a longitudinal direction arranged on the FFC wire. In some embodiments, the metal ink printing line 2020 is formed by printing a metal material by an inkjet printing, a screen printing, a gravure printing, or combinations thereof.

Referring to FIG. 16, in some embodiments, the electrical device further includes a cross-talk prevention space 2040 for preventing cross-talk between the metal ink printing line 2020 and the FFC wire line 2030.

In some embodiments, each of the metal ink printing line 2020 and the FFC wire line 2030 are located on both side parts where the cross-talk prevention space 2040 is arranged.

In some embodiments, the electrical device includes one or more metal ink printing lines 2020 according to necessity.

In some embodiments, the FFC wire line 2030 is arranged with an FFC type wire, and adhered on the PCT film via an adhesive so as to be arranged in a necessary number.

Referring to FIG. 17, the electrical device further includes a cross-talk prevention dummy line 2050 between the metal ink printing line 2020 and the FFC wire line 2030 to prevent signal cross-talk therebetween.

In some embodiments, the cross-talk prevention dummy line 2050 is formed by an inkjet printing, a screen printing, a gravure printing, or combinations thereof.

In some embodiments, the cross-talk prevention dummy line 2050 includes a metal layer including a metal material or a semiconductor layer including a semiconductor material.

Manufacturing Method of Vehicular Electrical Device

In some embodiments, the instant specification is directed to a manufacturing method of a vehicular electrical device.

In some embodiments, the manufacturing method of a vehicular electrical device includes forming a pattern layer on an upper surface of a PCT film used as a base film by printing a metal material or a semiconductor material by a printing method, adhering a coverlay film to the upper surface of the pattern layer, and integrally bonding the base film, the pattern layer and the coverlay film with an adhesive layer including a thermosetting adhesive or a thermoplastic adhesive as a medium.

In some embodiments, the printing method is an inkjet printing, a screen printing, a gravure printing, or combinations thereof.

In some embodiments, the manufacturing method of an electrical device includes (A) a step of arranging any one film selected from a PI film, a PEN film and a PCT film as a base film, (B) a step of forming a pattern layer on an upper surface of the base film by printing a metal material or a semiconductor material by any one printing method selected from inkjet, screen printing and gravure, (C) a step of arranging and bonding together a PCT film as a coverlay film so as to cover the pattern layer, (D) a step of forming a silk printing layer on the upper surface of the PCT film bonded as the coverlay film by a silk printing method, (E) a step of forming an outline shape by processing an outline with a mold or laser processing on the resultant product after the step (D), and (F) a step of bonding an aluminum plate for a heat releasing function to a lower part of the resultant product after the step (E).

Patterning Formation Method

In some embodiments, the instant specification is directed to a patterning formation method of a printing method formed on a film base for achieving the aims described above.

In some embodiments, the patterning formation method includes forming a metal layer on an upper surface of a PCT film used as a base film by printing a metal material. In some embodiments, printing the metal material comprises an inkjet printing, a screen printing, a gravure printing or combinations thereof.

In some embodiments, the patterning formation method includes forming an insulation layer on an upper surface of a PCT film used as a base film by printing an insulating material. In some embodiments, printing the insulating material comprises an inkjet printing, a screen printing, a gravure printing or combinations thereof.

In some embodiments, the patterning formation method includes forming a semiconductor layer (active layer) on an upper surface of a PCT film used as a base film by printing a semiconductor material. In some embodiments, the semiconductor material is printed by an inkjet printing, a screen printing, a gravure printing or combinations thereof.

In some embodiments, the patterning formation method includes arranging a polyimide (PI) film or a poly ethylene napthalene (PEN) film as a base film on a lower part, arranging a PCT film as a coverlay film on an upper part, and forming a silk printing layer on an upper surface of the PCT film by a silk printing method so as to use the silk printing layer in the arrangement of electronic components.

In some embodiments, the patterning formation method includes arranging a PCT film as a base film on a lower part, arranging a PCT film as a coverlay film on an upper part, and forming a silk printing layer on an upper surface of the PCT film used as the coverlay film by a silk printing method so as to use the silk printing layer in the arrangement of electronic components.

In some embodiments, the patterning formation method includes forming a metal layer on the upper surface of the base film by printing a metal material. In some embodiments, the metal material is printed by an inkjet printing, a screen printing, a gravure printing, or combinations thereof.

According to the embodiments of the instant specification, generation of oligomers by moisture absorption in conventional electrical devices is overcome by the structure including a printed electronic circuit on at least one side of a PCT film, using the patterning formation method. The electrical devices according to the embodiments are resistant to surface tearing or peeling when subjecting to long-term high temperature and high humidity conditions, thereby ensuring long-term reliability.

In addition, according the embodiments of the instant specification, a variety of electrical devices, such as interface products, which have excellent quality compared with conventional products can be manufactured. Comparing with conventional manufacturing methods, the embodiments of the instant specification result in reduced processes and manufacturing time, and reduced product costs.

EXPLANATION OF REFERENCE NUMBERS

101: Base film (PCT film)
102: Metal layer
202: Insulating layer
302: Semiconductor layer
403: Silk printing layer

What is claimed is:

1. A vehicular bus bar cable comprising:
    a flexible flat cable (FFC) bus bar body comprising two or more Poly Cyclohexylene dimethylene Terephthalate PCT) films, the two or more PCT films being stacked on each other;
    an adhesive layer bonding at least two of the two or more PCT films;
    an FFC wire within the bus bar body;
    a metal printing layer formed on an upper part of the bus bar body; and
    a metal terminal connected to the FFC wire and exposed at an end of the bus bar body,
    wherein the two or more PCT films are independent sheets.

2. The vehicular bus bar cable according to claim 1, wherein the stacked PCT films are connected via the FFC wire.

3. The vehicular bus bar cable according to claim 1, further comprises a metal plate having a rivet hole, wherein the metal plate is connected to a side where the FFC wire is exposed from the bus bar body.

* * * * *